(12) United States Patent
Blake et al.

(10) Patent No.: US 6,178,436 B1
(45) Date of Patent: Jan. 23, 2001

(54) APPARATUS AND METHOD FOR MULTIPLICATION IN LARGE FINITE FIELDS

(75) Inventors: Ian F. Blake, Palo Alto; Gadiel Seroussi, Cupertino, both of CA (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/108,998

(22) Filed: Jul. 1, 1998

(51) Int. Cl.$^7$ ........................................................ G06F 7/00
(52) U.S. Cl. .............................................................. 708/492
(58) Field of Search ................................... 708/491–492; 380/28

(56) References Cited

U.S. PATENT DOCUMENTS

| | | |
|---|---|---|
| 4,162,480 | 7/1979 | Berlekamp . |
| 4,216,531 | 8/1980 | Chiu . |
| 4,587,627 | 5/1986 | Omura et al. . |
| 4,745,568 | 5/1988 | Onyszchuk et al. . |
| 4,800,515 | 1/1989 | Hori et al. . |
| 4,852,098 | 7/1989 | Brechard et al. . |
| 4,866,654 | 9/1989 | Yamada . |
| 5,046,037 | 9/1991 | Cognault et al. . |
| 5,502,665 | 3/1996 | Im . |
| 5,680,340 | 10/1997 | Glover et al. . |
| 5,689,452 | 11/1997 | Cameron . |
| 5,742,534 | 4/1998 | Monier . |
| 6,003,057 | * 12/1999 | Dworkin et al. ................... 708/492 |

OTHER PUBLICATIONS

F. J. MacWilliams and N. J. A. Sloane "The Theory of Error–Correcting Codes", 1977, Elsevier Science B.V., pp. 94–124.

Alfred J. Menezes, ed., Ian F. Blake, XuHong Gao, Ronald C. Mullin, Scott A. Vanstone, Tomik Yaghoobian Applications of Finite Fields, 1993, Kluwer Academic Publishers, pp. 93–115.

A Hypersystolic Reed–Solomon Decoder, Elwyn Berlekamp, Gadiel Seroussi and Po Tong, from Stephen B. Wicer and Vijay K. Bhargava "Reed–Solomon Codes and Their Applications", eds., 1994, IEEE, pp. 205–241.

* cited by examiner

Primary Examiner—Tan V. Mai
(74) Attorney, Agent, or Firm—MPS (57) ABSTRACT

An apparatus and method are shown for multiplying vectors of length n in a finite field. A first vector is circularly shifted in a first shift register under control of a shift signal. A second vector is circularly shifted in a second shift register also under control of the shift signal. An accumulated result vector is circularly shifted in a third shift register under control of the shift signal. Elements of the second vector are logically combined according to a tensor of the multiplication operation to obtain an intermediate result which is combined with the elements of the accumulated result vector to obtain a combination result vector. However, the combination result vector is only loaded into the third shift register when a logic '1' value is present in a first position of the first shift register. Therefore, the first, second and third shift registers can be circularly shifted until a logic '1' is encountered in the first vector, at which time the combination result vector is loaded into the third shift register. Since a vector will, on average, contain n/2 elements that are logic '1', the number of operations for a multiplication can be reduced, on average, to n/2.

10 Claims, 6 Drawing Sheets

```
matrixT :- proc ( )
local i, j;
global N,T;
M  :=array (1. . 2*N);
T:=array (1. .2,1. .N);
        for i from 1 to N do M[i]  : = 2^ (i-1) mod (2*N +1) od;
        for i from 1 to N do M[i+N]  : = (-1)* 2^ (i-1) mod (2*N +1) cd;
        for i from 1 to N do
        for j from 1 to 2*N do
            if M[j] = 2^(i-1) -1 mod (2*N+1) then T[1,i] := j-1  mod N+1 fi;
            if M[j] = 2^(i-1) +1 mod (2*N +1) then T[2,i] := j-1  mod N+1 fi;
        od;
        od;
T[1,1] : = 0;
#print (T);
T;
end;

IND : = pro ( )
global N, T, IND1;
local i, j;
IND1 : = array (1. .(2*N), 1. .N);
IND1[1,1] := 2; IND1 [N+1, 1] :=1;
for i from 2 to N do IND1 [1,i] := T[1,i] ;
                IND1[N+1, i] :=T[2,i]  od;
            for i from 2 to N do
              IND1 [i, 1] : = (IND1 [i-1, N] mod N) +1;
              IND1 [N+i, 1] := (IND1 [N+i-1,N] mod N) +1;
                for j from 2 to N do
              IND1 [i,j] := (IND1 [i-1, j-1] mod N) +1;
              IND1 [N+i, j] := (IND1[N+i-1, j-1] mod N) +1;
              od;
            od;
IND1;
end;
```

FIG. 5

```
ffmult := proc (a,b)
local i, j, c;
global N,T,IND1;
c := array (1. .N);
for i from 1 to N do c[i] := 0 od;
for i from 1 to N do if a[i] = 1 then
for j from 1 to N do
        c[j] := c[j] + a [i]*(b[IND1[i,j]]+b[IND1[i+N,j]])
        od;
c[i] := (c[i] - a[i]*b[IND1[i+N,i]]);
fi;
od;
for i from 1 to N do c[i] := c[i] mod 2 od;
c;
end;
```

FIG. 5(cont'd)

APPARATUS AND METHOD FOR MULTIPLICATION IN LARGE FINITE FIELDS

BACKGROUND OF THE INVENTION

1. Field of the Invention

The present invention relates generally to methods and circuits for computing and, more particularly, to methods and circuits for computing the product of two elements in a finite field.

2. Description of the Related Art

Multiplication over large finite fields, also known as Galois fields, is used in the implementation of certain cryptographic protocols based on a theory of elliptic curves over Galois fields. These cryptographic protocols are highly computationally intensive and therefore consume a significant level of computational resources in order to perform Galois field arithmetic. Consequently, any reduction in the number of operations required for Galois field arithmetic will have a significant impact on the overall consumption of computational resources.

Generally speaking, a field is a number system with addition, subtraction, multiplication and division. The operations on the elements of the field should be associative, distributive and commutative. Therefore, there should be an element 0, where 0+x=x, and an element 1, where 1*x=x. In addition, for every x, there is a (−x), where x+(−x)=0. Further, for every value of x that is not 0, there is an inverse (1/x) where x*(1/x)=1.

Some well-known examples of fields are the real numbers, the rational numbers and the complex numbers. Each of these sets has an infinite number of elements and are therefore infinite fields.

Finite fields have a finite number of elements. As an example, a finite field GF(p) is a field with p elements, where p is a prime number. The elements of the field GF(p) may be taken to be 0, 1, . . . , p−1. Elements of the field may be added, subtracted, multiplied and inverted, but the resulting number is reduced to a modulo value of p (mod p) at the end of the computation.

The smallest of all fields is the finite field GF(2), which is a finite field having two elements: 0 and 1. The elements may be added, subtracted, multiplied and divided. However, 1+1=0, because the modulo equivalent of the result of the addition, 2, is 0, i.e. 1+1=2 mod 2=0. Similarly, 0−1=1, because the result of the subtraction, (−1), is reduced to a modulo value of p, which is 2, the result of the subtraction is a modulo 1, i.e. 0−1=(−1) mod 2=1.

There are several representations of extension fields $GF(2^n)$ that lend themselves to efficient arithmetic implementation over the binary field GF(2). All such fields are referred to as having characteristic 2. Fields of characteristic 2 are the fields of primary interest in the present invention.

The finite field $GF(2^n)$ is a vector space of dimension n over GF(2). As such, it can be represented using any basis of n linearly independent elements of $GF(2^n)$ over the binary field GF(2). Therefore, elements of $GF(2^n)$ are represented by binary vectors of length n. Field addition is realized in all bases by a bit-wise exclusive OR (XOR) operation, whereas the structure of field multiplication is determined by the choice of basis for the representation.

Two families of bases are commonly used to represent the field $GF(2^n)$: standard (or polynomial) representation and normal basis (NB) representation.

In standard polynomial representation, the basis elements have the form $1, \omega, \omega^2, \ldots \omega^{n-1}$, where w is a root in $GF(2^n)$ of an irreducible polynomial P(κ) of degree n over GF(2). In an equivalent interpretation of this representation, the elements of $GF(2^n)$ are polynomials of degree <n over GF(2), and arithmetic is carried out modulo an irreducible polynomial P(κ) of degree n over GF(2).

In NB representation, the basis elements have the form $\alpha, \alpha^2, \ldots, \alpha^{2^{n-1}}$ for a certain element $\alpha \in GF(2^n)$. This defines a normal basis. In addition, if for all $0 \leq i1 \neq i2 \leq n-1$ there exists j1, j2 such that, $\alpha^{2^{i1}+2^{i2}} = \alpha^{2^{j1}} + \alpha^{2^{j2}}$, then the basis is called optimal normal basis (ONB). The element a is called the generator of the basis. Optimal normal bases exist for an infinite subset of values of n.

Multiplication in NB representation format will now be discussed. For a given normal basis $\{\alpha, \alpha^2, \ldots, \alpha^{2^{n-1}}\}$ for a certain element $\alpha \in GF(2^n)$, a series of matrices or tensors is defined by $$\alpha^{2^i}\alpha^{2^j} = \sum_{k=0}^{n-1} t_{ij}^{(k)} \alpha^{2^k} \qquad (1)$$

Also, define a matrix $T_k = t_{ij}^{(k)}$. In other words, the (i, j) element of matrix $T_k$ is $t_{ij}^{(k)}$. All of the matrices $T_k$, (k=0, 1, . . . , n−1), are closely related, e.g. $t_{ij}^{(k)} = t_{i-k,j-k}^{(0)}$, where $0 \leq i, j, k \leq n-1$ and the subscripts are modulo n.

Furthermore, we identify an element $a \in GF(2^n)$, where $$a = \sum_{i=0}^{n-1} a_i \alpha^{2^i}$$

and the vector $a=(a_0, a_1, \ldots, a_{n-1})$, $a_i \in GF(2)=\{0, 1\}$. We also identify a similarly constituted element $b \in GF(2^n)$.

The elements a and b, where $a, b \in GF(2^n)$, are multiplied to obtain a result $c \in GF(2^n)$. It can be shown that the $k^{th}$ component of the vector for c is shown in equation (2) below:

$$c_k = aT_k b^t = (a_0, a_1, \ldots, a_{n-1})[T_k] \begin{matrix} b_0 \\ b_1 \\ \vdots \\ b_{n-j} \end{matrix} \qquad (2)$$

Now, let $a^{[l]}$ be the $l^{th}$ cyclic left shift of the vector $(a_0, a_1, \ldots, a_{n-1})$, where $a^{[l]}=(a_l, a_{l+1}, \ldots, a_{n-1}, a_0, \ldots, a_{l-1})$. Then equation (2) can be written as $$c_k = a^{[k]} T_0 (b^{[k]})^t = (a_k, a_{k+1}, \ldots, a_{k-1})[T_0] \begin{matrix} b_k \\ b_{k+1} \\ \vdots \\ b_{k-1} \end{matrix} \qquad (3)$$

Figure 1:
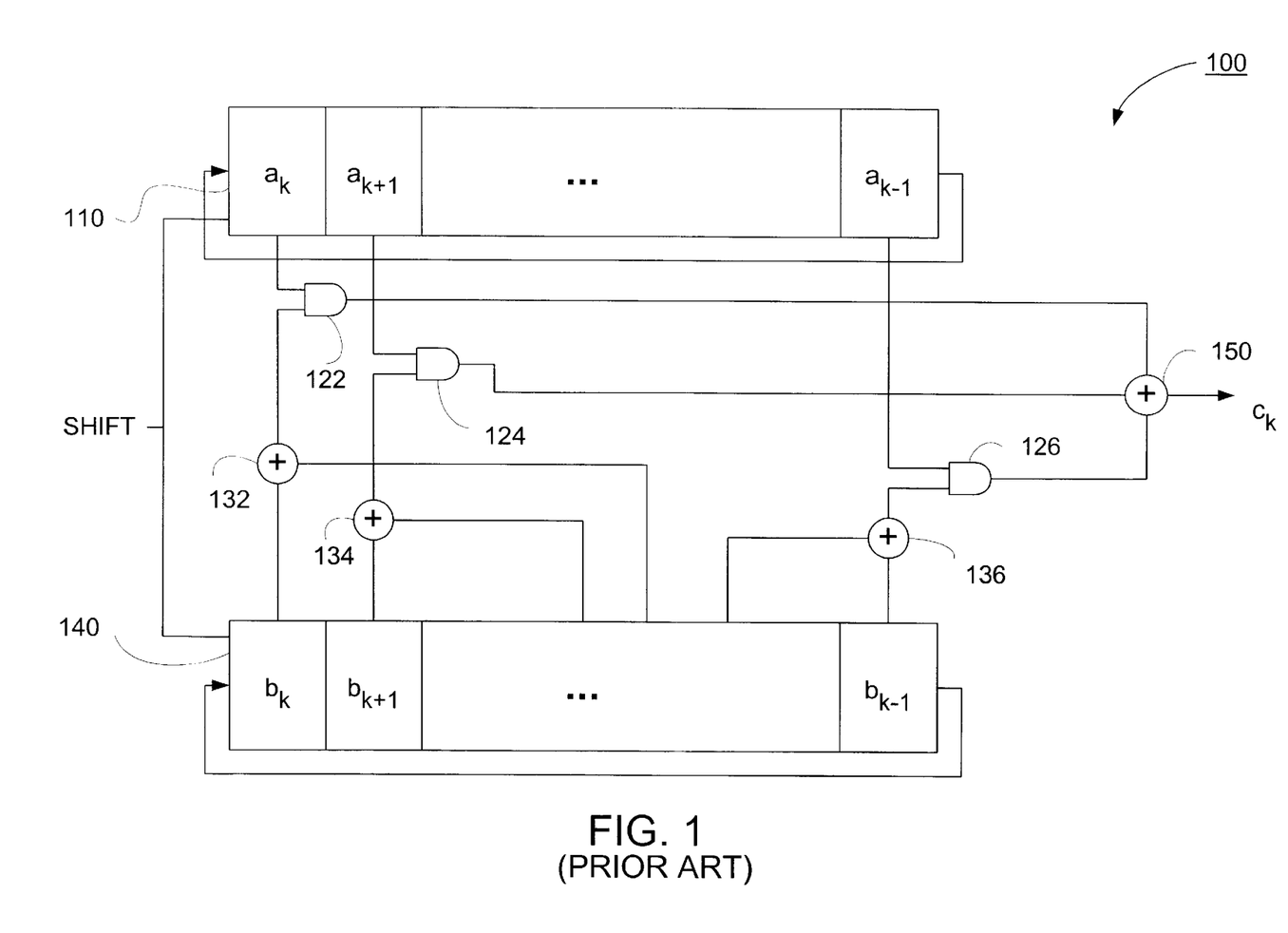
FIG. 1 is a functional block diagram of a conventional finite field vector multiplier.

Equation (3) can then be implemented in a multiplier circuit, such as conventional multiplier 100 illustrated in FIG. 1. Multiplier 100 has two shift registers 110 and 140. Each of shift registers 110 and 140 is circularly connected with a shift output being coupled to a shift input of each register. Each of the shift registers also receives a SHIFT signal at a shift control input which causes a right-shift operation to be performed.

Each of shift registers 110 and 140 has a parallel output from each position of the register. The parallel outputs from shift register 110 are coupled to a series of AND gates 122, 124 and 126. The AND gates shown in the diagram are representative of a complete series of n AND gates where there is one AND gate corresponding to each position, or vector element, in shift register 110.

The parallel output from shift register 140 are coupled to a series of modulo 2 adders 132,134 and 136. The modulo 2 adders 132,134 and 136 are representative of a complete series of n adders where there is one adder corresponding to each position in shift register 110. The inputs to each of the series of adders are determined by the tensor Tk implemented by the multiplier circuit 100.

For an ONB representation, each of adders 134 . . . 136 will have two input taps coupled to register 140, as shown. However, adder 132 would have only one input and could therefore be replaced with a simple signal line. For a general NB representation, the number of taps off each adder 132, 134, . . . 136 will vary according to the representation and function being implemented by the multiplier.

The outputs from each of the series of adders are input to the corresponding one of the series of AND gates. Thus, the output of adder 132 is input to AND gate 122, the output of adder 134 is input to AND gate 124, and the output from adder 136 is input to AND gate 126. The output of each of the series of AND gates, in turn, is input to modulo 2 adder 150.

In operation, vector element a is loaded into shift register 110 and vector element b is loaded into shift register 140. The elements of vectors a and b are operated upon by the combinational logic of the series of AND gates 122,124 and 126 as well as the series of adders 132,134 and 136. Thus, the element $a_k$ of vector a is input to AND gate 122 and ANDed with the output of adder 132 which modulo 2 adds the elements (bk, $b_{k+1}$, . . . , $b_{k-1}$) of vector b, as determined by the tensor $T_k$. Similarly, element $a_{k+1}$ is input to AND gate 124 for combination with the result of modulo addition of the elements of vector b output from adder 134 and element $a_{k-1}$ is input to AND gate 126 for combination with the result of modulo addition of the elements of vector b output from adder 136.

Adder 150 then adds the outputs of the series of AND gates 122, 124 and 126. The result at the output of adder 150 is an element $c_k$ of result vector c. The vector c appears serially at the output of adder 150, one bit for each cycle of the SHIFT signal. Note that each element $c_k$ of vector c is complete at the corresponding $k^{th}$ cycle. Also note that all the elements of vectors a and b enter into the calculation of $c_k$ in each cycle. Thus, calculation of result vector c requires n clock cycles, one clock cycle for each element of c=($c_0$, $c_1$, . . . , $c_{n-1}$). In addition, since k=(0, 1, . . . , n–1), n multiplies must be performed to obtain all n values of $T_k$. Thus, the complexity of the multiplication operation is proportional to $n^2$.

There are many conventional approaches to multiplication of vectors in finite fields. Multiplier 100 is representative of one conventional approach to multiplication. Other approaches will vary, but multiplier 100 remains suitably representative for purposes of describing the conventional technology.

Large finite fields are the basis of many modern cryptographic algorithms, e.g. elliptic curve cryptography. In these applications, n is typically on the order of 100 to 400 which, given that the complexity of the multiplication operation is proportional to $n^2$, each field multiply will require on the order of ten thousand operations. The field arithmetic therefore becomes a computational bottleneck and it becomes important to reduce the overhead required to perform encryption and decryption. On the other hand, the explosive development of the Internet is expected to make the use of encryption become increasingly widespread.

Accordingly, the need remains for ways to reduce the overhead required to perform multiplication operations in large finite fields.

SUMMARY OF THE INVENTION

It is, therefore, an object of the invention to provide a method and apparatus for multiplication of vectors in a finite field which reduces the number of operations that must be performed.

An embodiment of a multiplier, according to the present invention, for multiplying first and second vectors in a finite field, each of the first and second vectors having a predetermined number of elements, includes a first shift register having the predetermined number of positions, where the first shift register is configured to receive the first vector and circularly shift the first vector responsive to a shift signal, and each one of the positions of the first shift register corresponds to an element of the first vector. There is also a second shift register having the predetermined number of positions, where the second shift register is configured to receive the second vector and circularly shift the second vector responsive to the shift signal, and where each one of the plurality of positions of the second shift register corresponds to one element of the second vector. Also included is a third shift register having the predetermined number of positions, where the third shift register is configured to accumulate a result vector and circularly shift the result vector responsive to the shift signal, and where the third shift register is further configured to load a combination result vector responsive to a load signal. And combinational logic is included which is configured to generate the combination result vector, where the combination result vector has the predetermined number of elements, where each element of the combination result vector corresponds to one element of the accumulated result vector, and wherein each element of the combination result vector is produced by modulo adding a subset of the elements of the second vector, where the subset of the elements of the second vector is determined by a predetermined tensor, to obtain an intermediate result, and modulo adding the intermediate result with the corresponding element of the accumulated result vector.

An embodiment of a method for multiplying first and second vectors in a finite field, according to the present invention, includes initializing a plurality of elements of an accumulated result vector, circularly shifting a plurality of elements of the first vector, a plurality of elements of the second vector and the plurality of elements of the accumulated result vector responsive to a shift signal until a logic '1' is encountered in a first position of the first vector, and logically combining, according to a predetermined tensor, the plurality of elements of the second vector with the logic '1' of the first position of the first vector to obtain an intermediate result. The method further involves combining the intermediate result with the plurality of elements of the accumulated result vector to form a combined result, and loading the combined result into the accumulated result vector.

An embodiment of a finite field multiplier, according to the present invention, is composed of a first shift register having a predetermined number of elements, a shift control input, and a first element data output, wherein the first shift register is configured to circularly shift a contents of its elements responsive to a shift signal received at the shift control input. Also included is a second shift register having the predetermined number of elements, a shift control input, and a series of element data outputs, wherein the second shift register is configured to circularly shift a contents of its elements responsive to the shift signal received at the shift control input of the second shift register. There is also a third shift register having the predetermined number of elements, a shift control input, a load control input, a series of element data inputs and a series of element data outputs, the third shift register being configured to circularly shift the contents of its elements responsive to the shift signal received at the shift control input of the third shift register, and where the third shift register is configured to store data present at the series of element data inputs in the elements responsive to the load signal. There is a second series of modulo adders, each one of the second series of modulo adders having first and second inputs and an output, the output of each one of the second series of modulo adders being coupled to the element data input of a corresponding element of the third shift register, the first input of each one of the second series of modulo adders being coupled to the element data output of the corresponding element of the third shift register, and the second input of each one of the second series of modulo adders being coupled to the output of a corresponding one of the series of AND gates. Finally, there is a control circuit having a clock input, a data input, a load control output and a shift control output, the clock input being configured to receive a clock signal, the data input being coupled to the data output of the first position of the first shift register, wherein the control circuit is configured to generate the load signal at the load control output responsive to a first logic value of the first position of the first shift register and a first phase of the clock signal, and further wherein the control circuit is configured to generate the shift signal at the shift control output responsive to a second phase of the clock signal.

The foregoing and other objects, features and advantages of the invention will become more readily apparent from the following detailed description of several embodiments of the invention which proceeds with reference to the accompanying drawings.

DETAILED DESCRIPTION OF THE PRESENT INVENTION

In the present invention, we define an inner product of vectors x and y as:

$$(x, y) = x_0 y_0 \oplus \ldots \oplus x_{n-1} y_{n-1} \leftarrow \{0, 1\}.$$

Applying the inner product form above to equation (2), $c_k$ can be expressed as follows:

$$c_k = a_0(t_0^{(k)}, b^{[0]}) + a_1(t_0^{(k-1)}, b^{[1]}) + \ldots + a_{n-1}(t_0^{(k+1)}, b^{[n-1]}) \quad (4)$$

Figure 2:
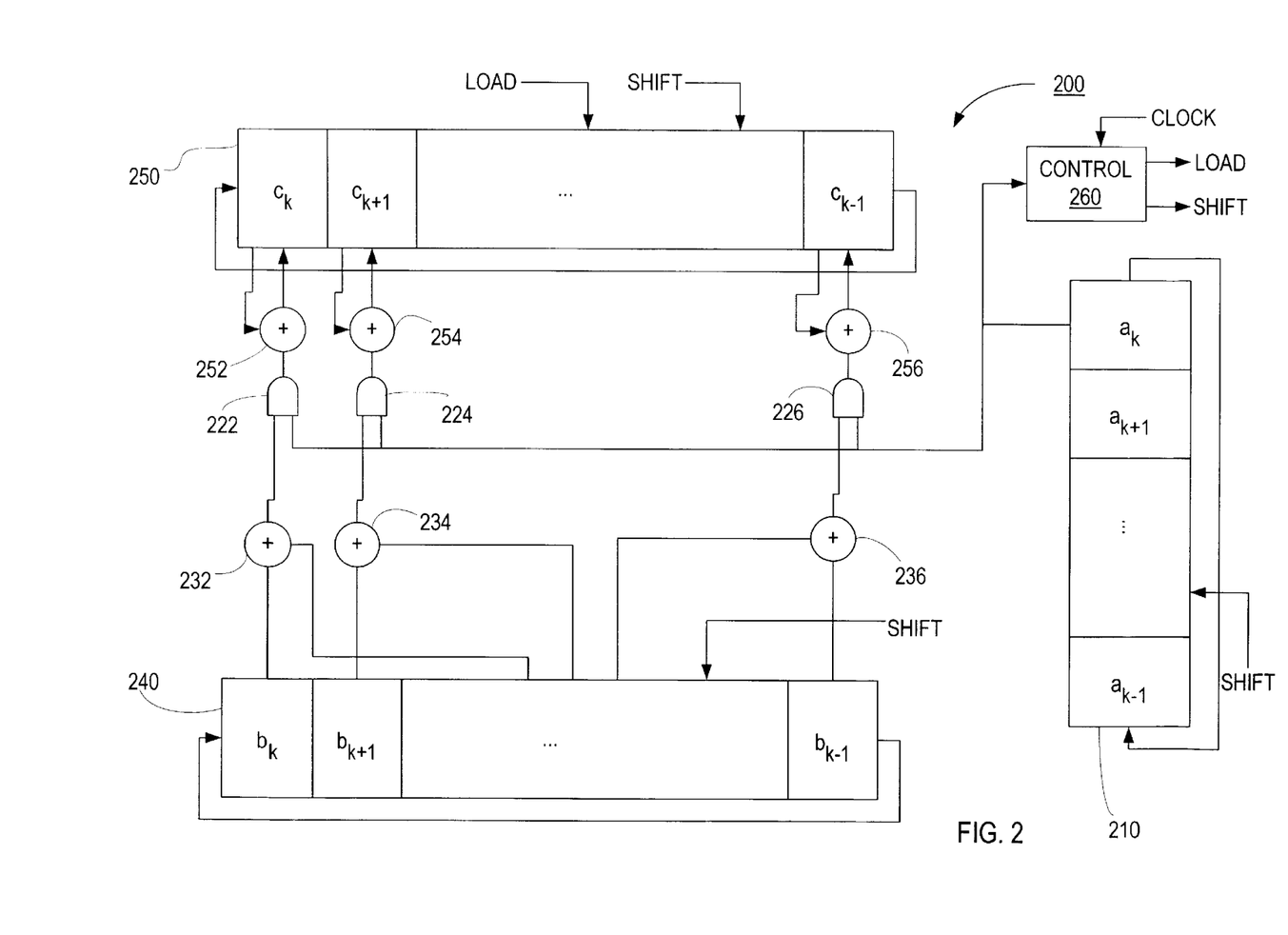
FIG. 2 is a functional block diagram of an embodiment of a multiplier according to the present invention.

Equation (4) is implemented in an embodiment of a multiplier 200 according to the present invention, as shown in FIG. 2. In multiplier 200, a shift register 250 is used as the accumulator for the elements of result vector c. Register 250 has n positions, one for each element of the result vector c. There is a parallel input and parallel output for each position of register 250. The content of each position is present at the parallel output for that position and each position can be loaded with the value at the parallel input for that position in response to a LOAD signal. A shift output of register 250 is circularly coupled to a shift input of the register and the content shifts one position in the direction of the shift output in response to each cycle of an input SHIFT signal.

Similar to conventional multiplier 100, vectors a and b are stored in shift registers 210 and 240, respectively. Registers 210 and 240 each have a shift output circularly coupled to a shift input so that the registers circularly shift their contents responsive to the SHIFT signal.

Register 240 has a parallel output from each position of the register. There is a first series of modulo 2 adders, represented by adders 232, 234 and 236, where there is one adder for each position of accumulator register 250, each position corresponding to one of the elements ($c_k, c_{k+1}, \ldots, c_{k-1}$) of result vector c. The inputs of the first series of modulo 2 adders are coupled to the parallel outputs of the positions of register 240, i.e. the elements ($b_k, b_{k+1}, \ldots, b_{k-1}$) of vector b, as determined by the tensor $T_k$ being implemented by the multiplier circuit 200.

Similar to multiplier 100 of FIG. 1, for an ONB representation, each of adders 234 . . . 236 will have two input taps coupled to register 240, as shown. However, adder 232 would have only one input and could therefore be replaced with a simple signal line. For a general NB representation, the number of taps off each adder 232, 234, . . . 236 will vary according to the representation and function being implemented by the multiplier.

There is also a series of AND gates, represented by AND gates 222, 224 and 226, where there is one AND gate for each position of accumulator register 250. Each of the AND gates is coupled to a corresponding one of the first series of adders. Thus, in FIG. 2, one input of AND gate 222 is coupled to the output of adder 232, one input of AND gate 224 is coupled to the output of adder 234, and one input of AND gate 226 is coupled to the output of adder 236.

However, unlike multiplier 100, only one position, or element, of vector a in register 210 is coupled to the combinational logic used to generate the result accumulating in register 250. Thus, a second input gate of each of AND gates 222, 224 and 226 is coupled to one position, i.e. the position corresponding to element ak, of register 210.

The outputs of the series of AND gates are coupled to a second series of modulo 2 adders represented by adders 252, 254 and 256, where there is one adder for each position of accumulator register 250, each position corresponding to one of the elements ($c_k, c_{k+1}, \ldots, c_{k-1}$) of result vector c. Each adder has a first input coupled to the output of a corresponding AND gate, a second input coupled to the parallel output from the corresponding position of register 250, and an output which is coupled to the parallel input of the corresponding position of register 250. Thus, adder 252 has one input coupled to the output of AND gate 222, another input coupled to the parallel output of position $c_k$ of register 250, and an output coupled to the parallel input of position $c_k$. Similarly, adder 254 has one input coupled to the output of AND gate 224, another input coupled to the parallel output of position $c_{k+1}$ of register 250, and an output coupled to the parallel input of position $c_{k+1}$. And adder 256 has one input coupled to the output of AND gate 226, another input coupled to the parallel output of position $c_{k-1}$ of register 250, and an output coupled to the parallel input of position $c_{k-1}$.

A control circuit 260 has one input coupled to the parallel output from position $a_k$ of register 210 and another input which receives a CLOCK signal. The control circuit then generates the LOAD and SHIFT signals. Note that the control circuit 260 is likely to be an adaptation of the existing control circuitry of a processor or other device with which multiplier 200 is integrated.

In operation, shift registers 210 and 240 are loaded with vectors a and b, respectively, and accumulator register 250 is initially cleared. During each clock cycle, the combinational logic will generate a result value at the output of the second series of adders, represented by adders 252, 254 and 256, which must be loaded into accumulator register 250. The control circuit 260 therefore toggles the LOAD signal in order to load the result value before toggling the SHIFT signal.

The control circuit will shift through all n values of vectors a, b and c in order to accumulate the result for vector c. However, multiplier 200 only uses one element $a_k$ of vector a in each clock cycle. If the value of element $a_k$ is a '0', then the output of each of series of AND gates 222, 224 and 226 will be zero and the output of the second series of adders 252, 254 and 256 will be an identity of the accumulated result in register 250. Therefore, control circuit 260 can toggle the SHIFT signal without toggling the LOAD until the next '1' value is encountered in position $a_k$ of register 210 without corrupting the result in accumulator register 250.

On average, only n/2 of the elements in register 210 will be '1'. Thus, the multiplication performed by multiplier 200 can be reduced to n/2 combinational multiplication operations. The multiplication operation of multiplier 200 is therefore proportional to n/2, a significant savings in computational resources and time over the conventional multiplier 100 of FIG. 1.

It should be noted that if the LOAD and SHIFT signals generated by control circuit 260 operate to prevent the data at the output of modulo adders 252, 254, . . . 256 from being loaded into accumulator register 250 when the output from shift register 210 is '0', then AND gates 222, 224 and 226 can be eliminated.

Figure 3:
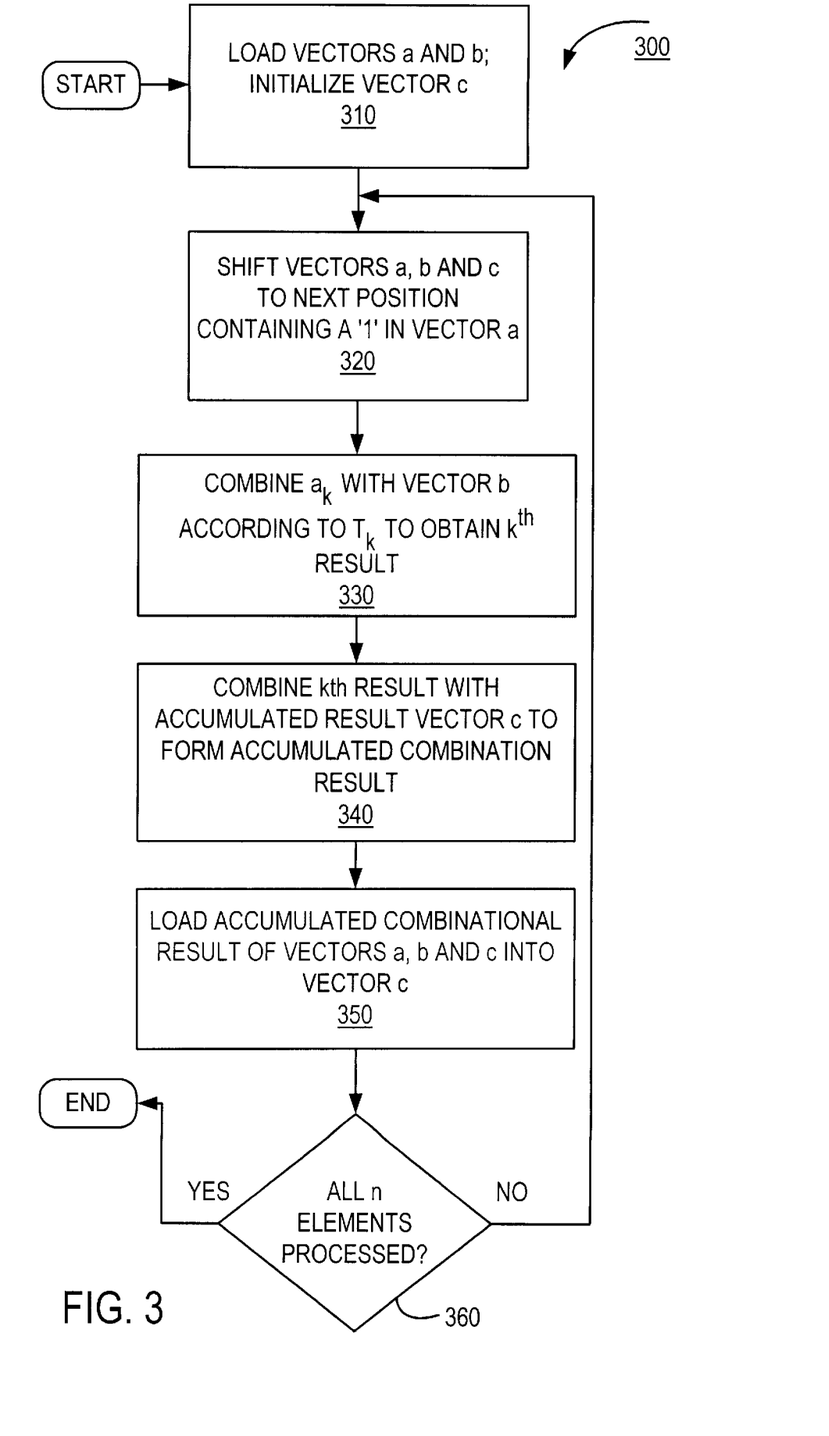
FIG. 3 is a control flow diagram of an embodiment of a method for multiplying vectors in a finite field according to the present invention.

An embodiment 300 of a method according to the present invention is illustrated in FIG. 3. At step 310, vectors a and b are loaded and vector c is initialized to a clear state. Then, at step 320, vectors a, b and c are all shifted to the first position in vector a that contains a '1'. In other words, all the vectors are shifted by the same number of positions, the number of positions being determined by the next position of vector a that contains a '1'.

At this point, the '1' resides in position $a_k$ of vector a. Thus, at step 330, $a_k$ is combined with vector b according to the tensor $T_k$ which produces the $k^{th}$ result. The $k^{th}$ result is then combined, at step 340, with the accumulated result in vector c in order to form an accumulated combination result. The accumulated combination result must then be loaded into vector c, at step 350.

If all n elements of vectors a and b have been processed, then the final result has accumulated in vector c and the process is complete. Otherwise, control flow shifts at step 360 back to step 320 where vectors a, b and c are again shifted to the next position containing a '1' in vector a.

The present invention only performs the combinational function in a finite field multiplication operation for the non-zero elements of one of the vectors. Thus, the present invention performs the multiplication operation in a manner which is proportional to n/2, where n is the number of elements in the vectors of the finite field. Therefore, the present invention can significantly reduce the time involved in performing finite field multiplication.

Figure 4:
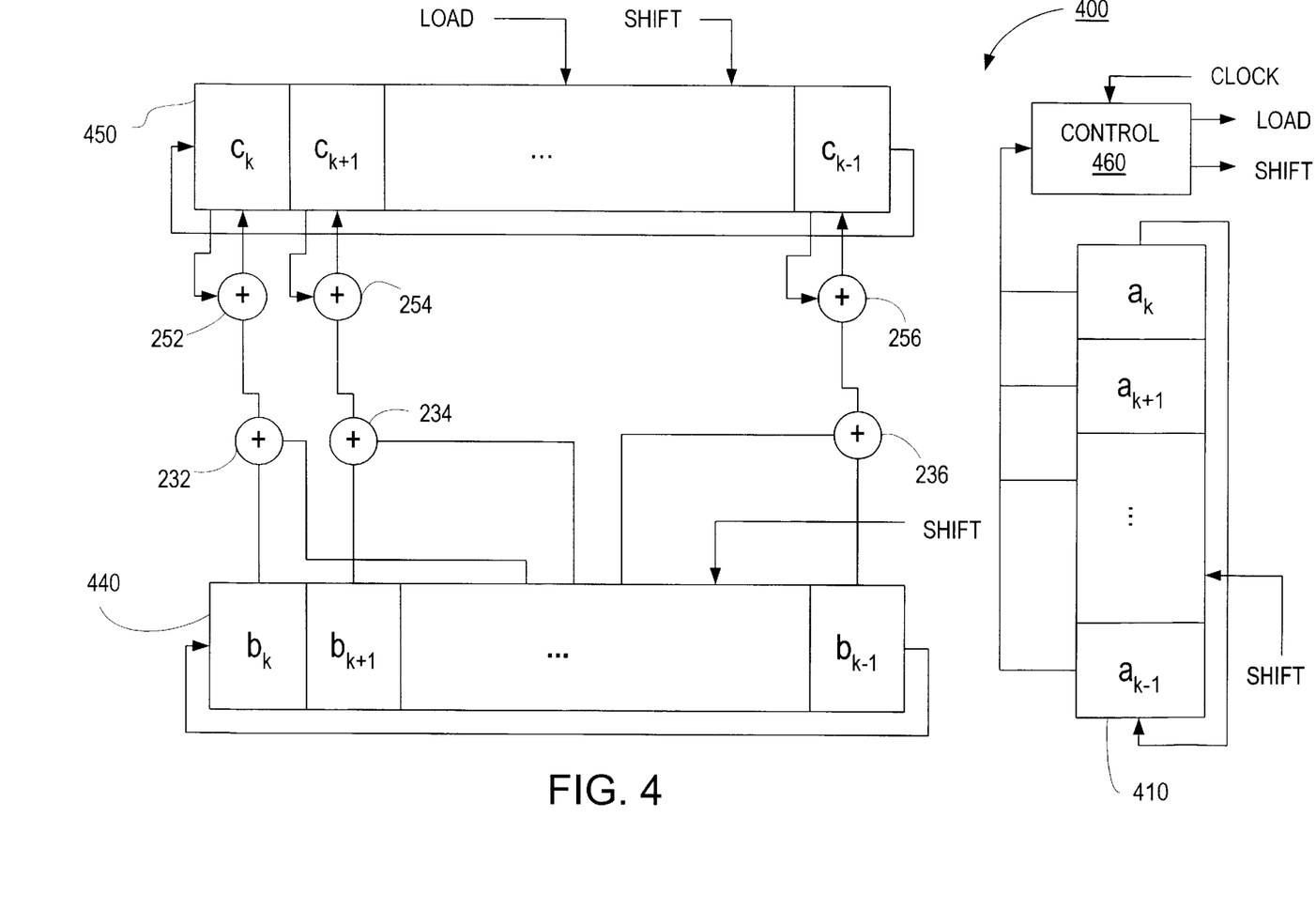
FIG. 4 is a functional block diagram of another embodiment of a multiplier according to the present invention.

FIG. 4 shows another embodiment of a multiplier 400, according to the present invention, which saves additional processing time. The multiplier 400 is a modification of multiplier 200 of FIG. 2. In FIG. 4, control circuit 460 is modified to include a leading-one detection function that is coupled to all the positions of register 410. The control circuit 460 then detects the position of the leading one in register 410 and calculates an integer value that is incorporated into the SHIFT signal which corresponds to the number of positions that must be shifted to place the leading one in the most significant position of register 410. Registers 410, 440 and 450 are constructed to perform a single-cycle multiple-position shift of their contents according to the integer value in the SHIFT signal. Thus, the multiplier 400 is able to perform the multiplication function in approximately the same number of clock cycles as there are bit positions that are set to '1' in register 410.

Also, control circuit 460 only toggles the LOAD signal after a lead one has been shifted to the MSB of register 410. Therefore, the AND gates interposed between the modulo adders 232, 234 and 236 and the modulo adders 252, 254 and 256 in FIG. 2 have been removed in FIG. 4.

Implementation of multiplier 400 in software is particularly appropriate because it is relatively easy to implement special shifts and, since operations are in series, saving shifts can lead to significant time savings. When multiplier 400 is implemented in hardware, additional circuit complexity is required to implement the special shifts and leading-one detection. However, the additional circuit complexity is offset by the improvements in computation speed, which is highly desirable in computationally intensive applications such as cryptography.

Figure 5:
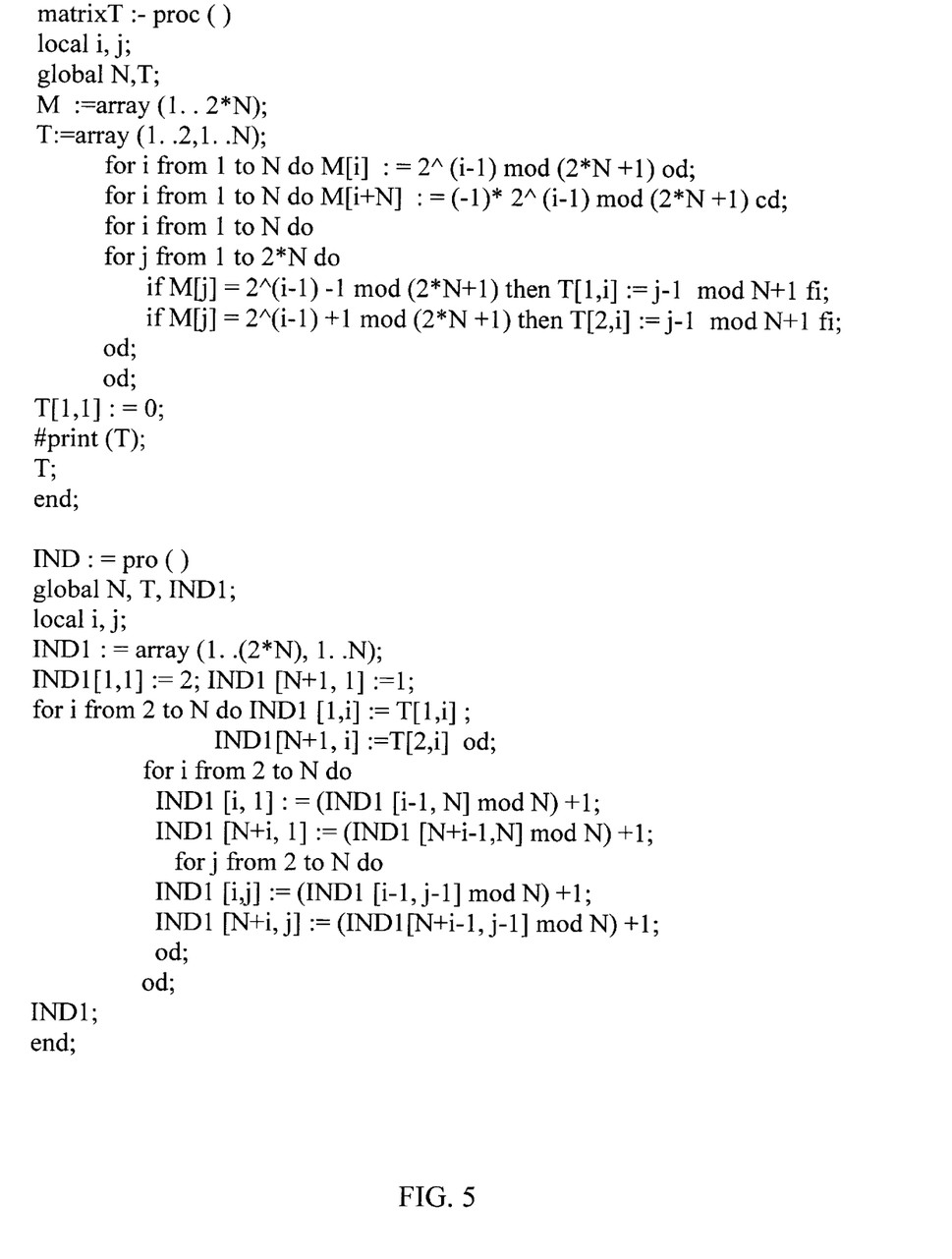
FIG. 5 is a MAPLE language listing of an embodiment of a multiplier algorithm according to the present invention for the case of an Orthogonal Normal Basis (ONB).

FIG. 5 is a listing of an embodiment, according to the present invention, of executable code for performing finite field multiplication in the symbolic computation package MAPLE. The code of FIG. 4 implements the present invention for ONB representation. However, the technique described here is valid for any NB, not just ONB. ONB, as mentioned above, is a special class of NB which has the property that the ONB tensor matrices are optimally sparse.

Having described and illustrated the principles of the invention in a number of embodiments thereof, it should be apparent that the invention can be modified in arrangement and detail without departing from such principles. We claim all modifications and variations coming within the spirit and scope of the following claims.

What is claimed is:

1. A multiplier for multiplying first and second vectors in a finite field, each of the first and second vectors having a predetermined number of elements, the multiplier comprising:

a first shift register having the predetermined number of positions, wherein the first shift register is configured to receive the first vector and circularly shift the first vector responsive to a shift signal, and each one of the positions of the first shift register corresponds to an element of the first vector;

a second shift register having the predetermined number of positions, wherein the second shift register is configured to receive the second vector and circularly shift the second vector responsive to the shift signal, and where each one of the plurality of positions of the second shift register corresponds to one element of the second vector;

a third shift register having the predetermined number of positions, wherein the third shift register is configured to accumulate a result vector and circularly shift the result vector responsive to the shift signal, and where the third shift register is further configured to load a combination result vector responsive to a load signal;

a control circuit coupled to the first shift register and operative to produce the shift signal and load signal responsive to one of the elements of the first vector; and combinational logic configured to generate the combination result vector, wherein the combination result vector has the predetermined number of elements, wherein each element of the combination result vector corresponds to one element of the accumulated result vector, and wherein each element of the combination result vector is produced by modulo adding a subset of the elements of the second vector, the subset of the elements of the second vector being determined by a predetermined tensor, to obtain an intermediate result, and modulo adding the intermediate result with the corresponding element of the accumulated result vector.

2. The multiplier of claim 1 in which the control circuit is configured to receive a clock signal and the element of the first vector present in a predetermined position of the first shift register, wherein the control circuit generates the load signal responsive to a first phase of the clock signal and a logic '1' in the predetermined position of the first shift register, generates the shift signal responsive to a second phase of the clock signal, and generates the predetermined number of cycles of the shift signal for each multiplication operation.

3. A computer-implemented method for multiplying first and second vectors in a finite field, the method comprising the steps:

storing each of the first and second vectors as a plurality of elements in respective first and second memory arrays;

initializing a plurality of elements of a third memory array as an accumulated result vector;

circularly shifting the plurality of elements of the first vector, a plurality of elements of the second vector and the plurality of elements of the accumulated result vector responsive to a shift signal until a logic '1' is encountered in a first position of the first vector;

logically combining, according to a predetermined tensor, the plurality of elements of the second vector with the logic '1' of the first position of the first vector to obtain an intermediate result;

combining the intermediate result with the plurality of elements of the accumulated result vector to form a combined result; and loading the combined result into the third memory array as the accumulated result vector.

4. The method of claim 3, including the step of repeating the steps of claim 3 until all the elements of the first vector have been processed.

5. The method of claim 3, wherein the step of logically combining, according to a predetermined tensor, the plurality of elements of the second vector with the logic '1' of the first position of the first vector to obtain an intermediate result includes:

modulo adding a subset of the plurality of elements of the second vector to obtain an element of the intermediate result for each one of the plurality of elements of the accumulated result vector, where the subset of the plurality of elements of the second vector corresponding to each one of the plurality of elements of the accumulated result vector is determined by the predetermined tensor.

6. The method of claim 5, wherein the step of combining the intermediate result with the plurality of elements of the accumulated result vector to form a combined result includes:

modulo adding the element of the intermediate result for each one of the plurality of elements of the accumulated result vector with the corresponding element of the accumulated result vector to obtain an element of the combined result for each one of the plurality of elements of the accumulated result vector.

7. The method of claim 6, wherein the step of loading the combined result into the accumulated result vector includes:

loading each element of the combined result into the corresponding one of the plurality of elements of the accumulated result vector.

8. A finite field multiplier, the multiplier comprising:

a first shift register having a predetermined number of elements, a shift control input, and a first element data output, wherein the first shift register is configured to circularly shift a contents of its elements responsive to a shift signal received at the shift control input;

a second shift register having the predetermined number of elements, a shift control input, and a series of element data outputs, wherein the second shift register is configured to circularly shift a contents of its elements responsive to the shift signal received at the shift control input of the second shift register;

a third shift register having the predetermined number of elements, a shift control input, a load control input, a series of element data inputs and a series of element data outputs, the third shift register being configured to circularly shift a contents of its elements responsive to the shift signal received at the shift control input of the third shift register, and where the third shift register is configured store data present at the series of element data inputs in the elements responsive to a load signal received at the load control input;

a first series of modulo adders, each of the first series of modulo adders having a plurality of inputs and an output, where the inputs of each of the first series of modulo adders are connected to the element data outputs of the second shift register according to a predetermined tensor;

a second series of modulo adders, each one of the second series of modulo adders having first and second inputs and an output, the output of each one of the second series of modulo adders being coupled to the element data input of a corresponding element of the third shift register, the first input of each one of the second series of modulo adders being coupled to the element data output of the corresponding element of the third shift register, and the second input of each one of the second series of modulo adders being coupled to the output of a corresponding one of the first series of modulo adders; and a control circuit coupled to the first shift register and operative to produce the shift signal and the load signal dependent on a logic value of a predetermined position in the first shift register.

9. The multiplier of claim 8, wherein the control circuit is further configured to count a number of shift signals generated and halts generation of the shift signal and the load signal when the shift count matches the predetermined number of elements.

10. The multiplier of claim 8 wherein the control circuit includes a clock input, a data input, a load control output and a shift control output, the clock input being configured to receive a clock signal, the data input being coupled to the data output of the first position of the first shift register, wherein the control circuit is configured to generate the load signal at the load control output responsive to a first logic value of the first position of the first shift register and a first phase of the clock signal, and further wherein the control circuit is configured to generate the shift signal at the shift control output responsive to a second phase of the clock signal.

* * * * *